United States Patent [19]
Cok et al.

[11] Patent Number: 5,398,077
[45] Date of Patent: Mar. 14, 1995

[54] METHOD FOR ADJUSTING THE LUMINANCE OF A COLOR SIGNAL

[75] Inventors: David R. Cok, Rochester; Heemin Kwon, Pittsford, both of N.Y.

[73] Assignee: Eastman Kodak Company, Rochester, N.Y.

[21] Appl. No.: 885,178

[22] Filed: May 19, 1992

[51] Int. Cl.⁶ .............................................. H04N 5/57
[52] U.S. Cl. ..................................... 348/687; 348/712
[58] Field of Search ................... 358/39, 37, 27, 30, 358/40, 21 R, 168, 32, 80, 162; H04N 9/69, 9/64, 7/77, 9/67, 5/57, 5/20; 348/687, 688, 684, 712, 713

[56] References Cited

U.S. PATENT DOCUMENTS

| | | | |
|---|---|---|---|
| 4,712,132 | 12/1987 | Soca | 358/37 |
| 4,835,599 | 5/1989 | Sigel | 358/30 |
| 4,876,599 | 10/1989 | Kihara | 358/162 |
| 4,963,948 | 10/1990 | Ueda et al. | 358/29 |
| 5,045,933 | 9/1991 | Tatsumi | 358/80 |
| 5,176,528 | 1/1993 | Robertson et al. | 364/715.02 |

FOREIGN PATENT DOCUMENTS 2250886 6/1992 United Kingdom .......... H04N 5/20

*Primary Examiner*—Victor R. Kostak
*Assistant Examiner*—Nathan S. Flynn
*Attorney, Agent, or Firm*—Raymond L. Owens

[57] ABSTRACT

A luminance signal is formed from an original color signal and is used to determine a new luminance. The original color signal is then adjusted to have the new luminance in a way that does not change the hue or saturation of the original color. The method is embodied in an analog or a digital circuit and in the alternate may be may be emulated in a general purpose computer. The method permits a change in color signals which affect the overall brightness only in a non-linear way, while adding only a small amount of additional hardware or computation to implement the invention.

8 Claims, 4 Drawing Sheets

METHOD FOR ADJUSTING THE LUMINANCE OF A COLOR SIGNAL

TECHNICAL FIELD OF THE INVENTION

The present invention is directed to digital image processing and more particularly to a method for adjusting only the input brightness (luminance) of triplet color signals without adjusting their color components.

BACKGROUND OF THE INVENTION

It is common practice to represent a color by three signals, either analog or digital, which correspond to three primaries. These primaries may be any one of a number of suitable triplets of colors such as red-green-blue or cyan-magenta-yellow. The red-green-blue triplet is in common use for color video signals. Different colors are represented by different combinations of intensities of these three primaries. It is often necessary to adjust the colors corresponding to triplets of intensities in order, for example, to correct for a color cast or to adjust the overall brightness.

The common method for performing such an adjustment is to modify each of the three signals comprising the color signal independently. In an analog system this is accomplished by passing each of the three signals through its own non-linear transformation circuit. This prior art method is illustrated in FIG. 1, wherein the triplet colors Rin, Gin, and Bin are transformed in the R, G, and B transforms, respectively, to form the output signals Rout, Gout, and Bout, respectively. In a digital system each signal is modified by its own, independent look-up table. The look-up table contains the new value for each possible input value and replaces the transform blocks of FIG. 1.

In U.S. Pat. No. 4,712,132, entitled "Device and Method for Reducing the Amplitude Range of Signals Representing an Image", by S. Soca there is disclosed, for example, in FIG. 2, a device that operates upon three input signals to obtain three output signals the values of which retain the same ratios as the input signals.

It is the purpose of this invention to propose a new method which adjusts only the brightness of the input color while not affecting its color. This new method can be embodied in an analog circuit, digital hardware, or be computed explicitly by a general-purpose computing device mimicking the digital hardware.

SUMMARY OF THE INVENTION

The method for adjusting the luminance components of a set of three color signals without adjusting the color components of the set is comprised of the steps of:
  forming a weighted average value of the luminance components of the set of three color signals;
  transforming the weighted average value by a non-linear transformation function to form a luminance difference signal; and
  forming a luminance adjusted set of three color signals by taking the sum of the luminance difference signal and the luminance components of the set of three color signals.

In the preferred enablement embodiments of the invention look-up tables may be used to form the weighted average signals and to perform the transformation of the weighted luminance signal or analog equivalents may be substituted.

From the foregoing it can be seen that it is a primary object of the present invention to provide an improved method and associated enabling circuitry for adjusting the luminance values of a triplet set of color signals.

It is a further object of the present invention to provide a method for adjusting only the luminance component of a multi-component set of color signals.

These and other objects of the present invention will become more apparent when taken in conjunction with the following description and drawings wherein like characters indicate like parts and which drawings form a part of the present description.

DESCRIPTION OF THE PREFERRED EMBODIMENTS

This new method operates as follows. A weighted average of the three separate color signals is formed. The weights are chosen so that the resultant signal represents the lightness of the color corresponding to the three input signals. The choice of these weights will depend on the precise spectral definition of the three input primaries. For standard video signals based on the standard NTSC primaries, these weights are (0.30, 0.59, 0.11) for red, green, and blue, respectively. The luminance signal is then transformed by the non-linear transformation function or altered by a single lookup-table. Then the difference between the new luminance value and the old luminance value is formed. Alternatively, the transfer function and the lookup table can be constructed to produce this luminance difference directly. The luminance difference, which may be either positive or negative, is then added to each of the three original input signals, to produce the three output signals. Since each of the three input signals has been modified by the same amount, the lightness of the color is changed without changing the color. With independent look-up tables, each color would be modified differently depending on the intensity of that color.

For example, to correct all incoming signals for insufficient strength in the blue channel, one would create red and green transfer functions or lookup tables which did not change the red and green signals, but provide a blue transfer function or lookup table which increases the blue signal.

While this traditional arrangement is adequate for correcting color casts or for implementing channel-independent calibrations, it is inadequate for the task of changing only the brightness of the color represented by the signal, when that change is a non-linear one.

Figure 1:
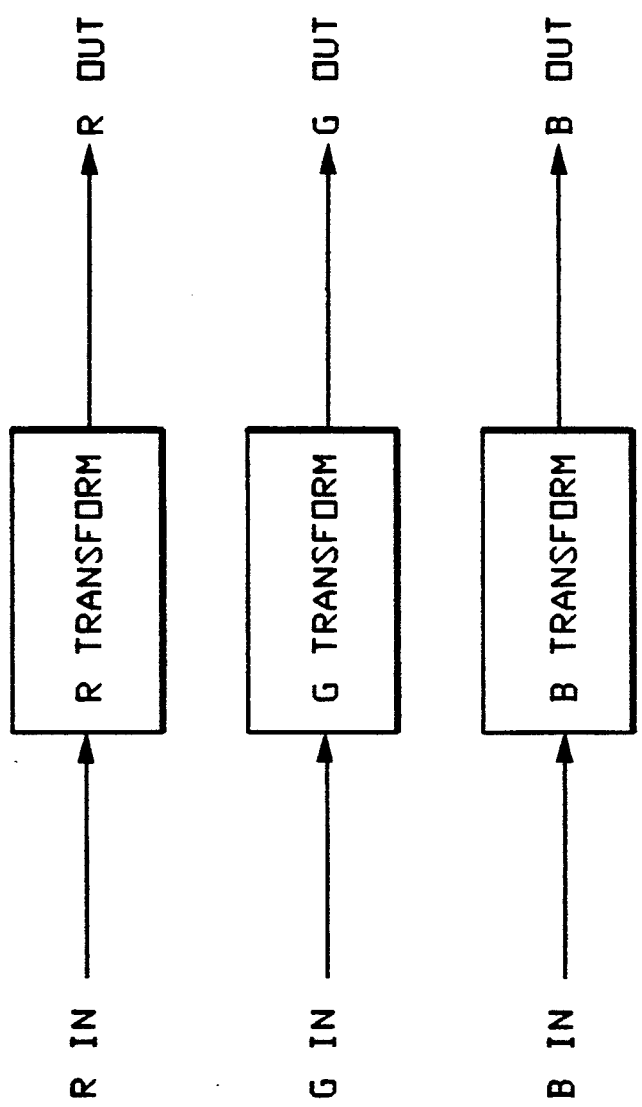
FIG. 1 illustrates in block diagram form a prior art method for transforming triplet input signals.
Figure 2:
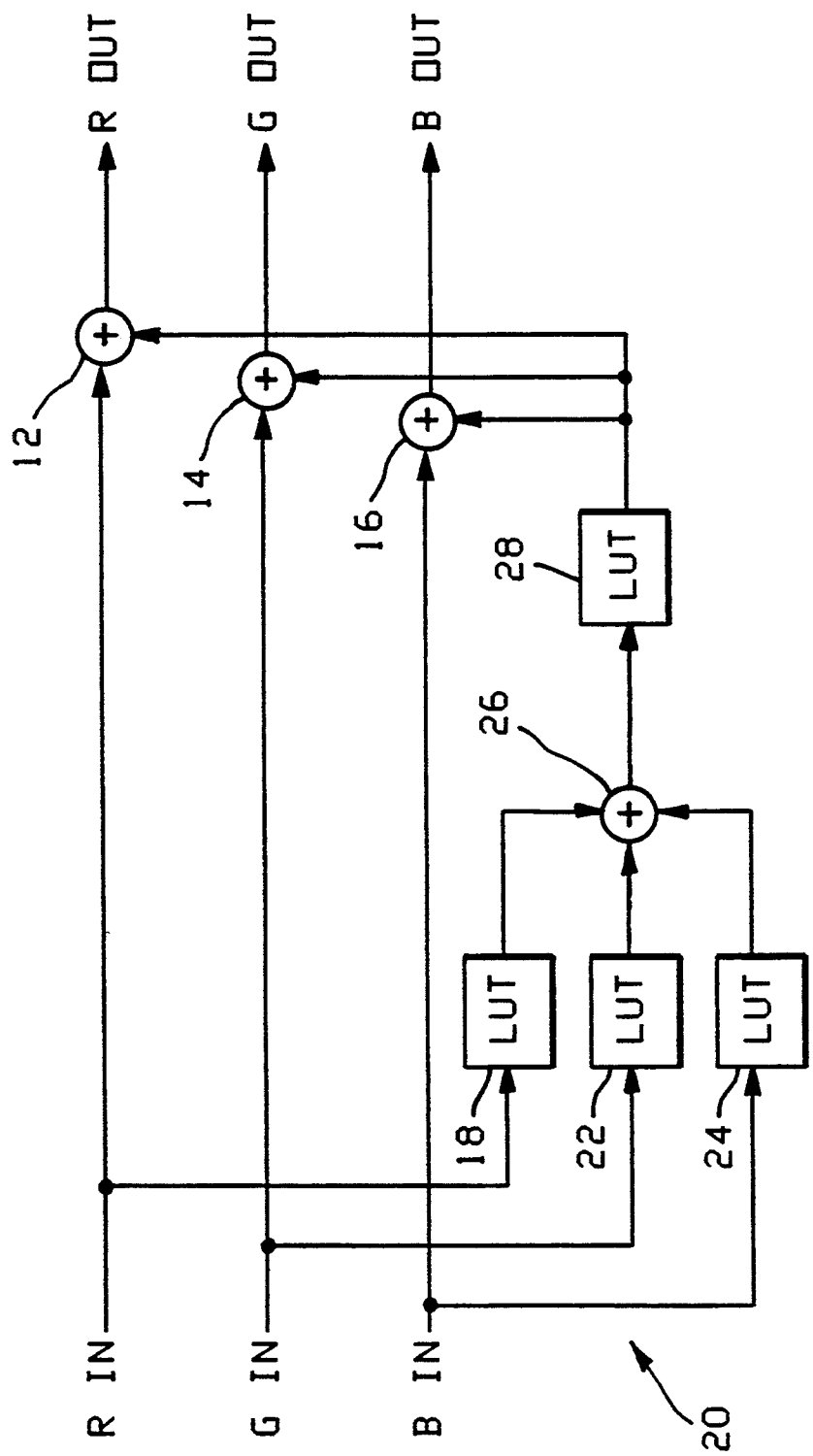
FIG. 2 illustrates in block diagram form a digital implementation of the present invention.

Referring to FIG. 2, wherein a digital implementation of the present invention is illustrated, a set of three input signals Rin, Gin, and Bin are forwarded to the inputs of three summing nodes 12, 14, and 16, respectively and to the inputs of three look-up tables 18, 22, and 24, respectively. The outputs from the look-up tables are summed together in a summing node 26 to provide a luminance signal. The luminance signal is directed to the input of a look-up table 28 with the output of the look-up table 28 being a luminance difference signal that is directed to each of the summing nodes 12, 14, and 16 to form the signals Rout, Gout, and Bout.

Figure 3:
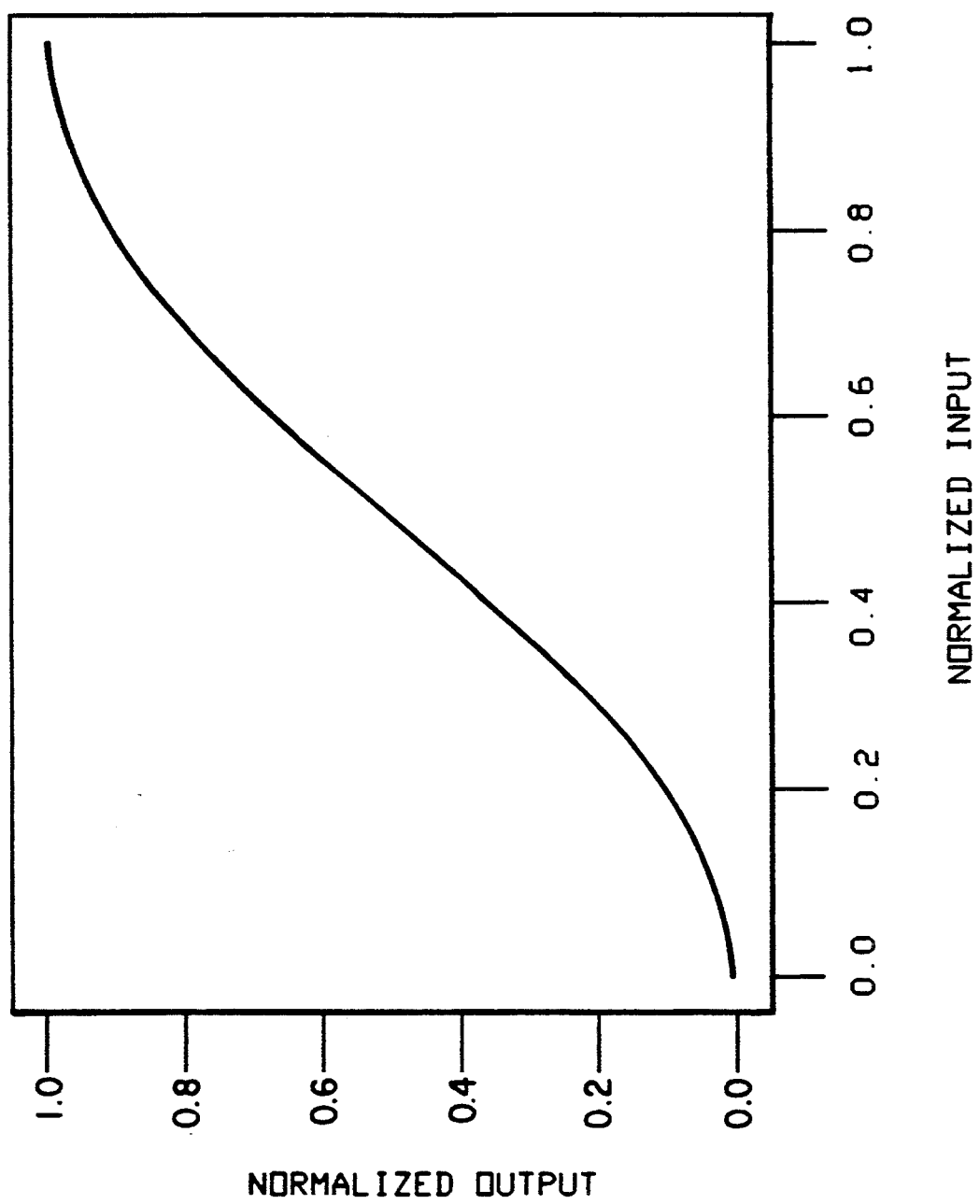
FIG. 3 illustrates a non-linear transform that may be used with the invention.

Referring to FIG. 3, wherein a graph of a nonlinear transfer function is shown, an input neutral signal of strength 0.8 in each channel, would be transformed to a neutral signal of strength of 0.9 in each channel. But a colored input signal of (0.2, 0.8, 0.8) in the three channels would be mapped to a new color of (0.1, 0.9, 0.9) which changes the overall color of the signal as well as its brightness. If instead the present invention is used the input color of (0.2, 0.8, 0.8) is converted to a luminance value using weights of (0.30, 0.59, 0.11), that luminance value is 0.62; this is mapped to a new luminance value of 0.7, as a luminance difference of 0.08. The new color is then (0.28, 0.88, 0.88).

Figure 4:
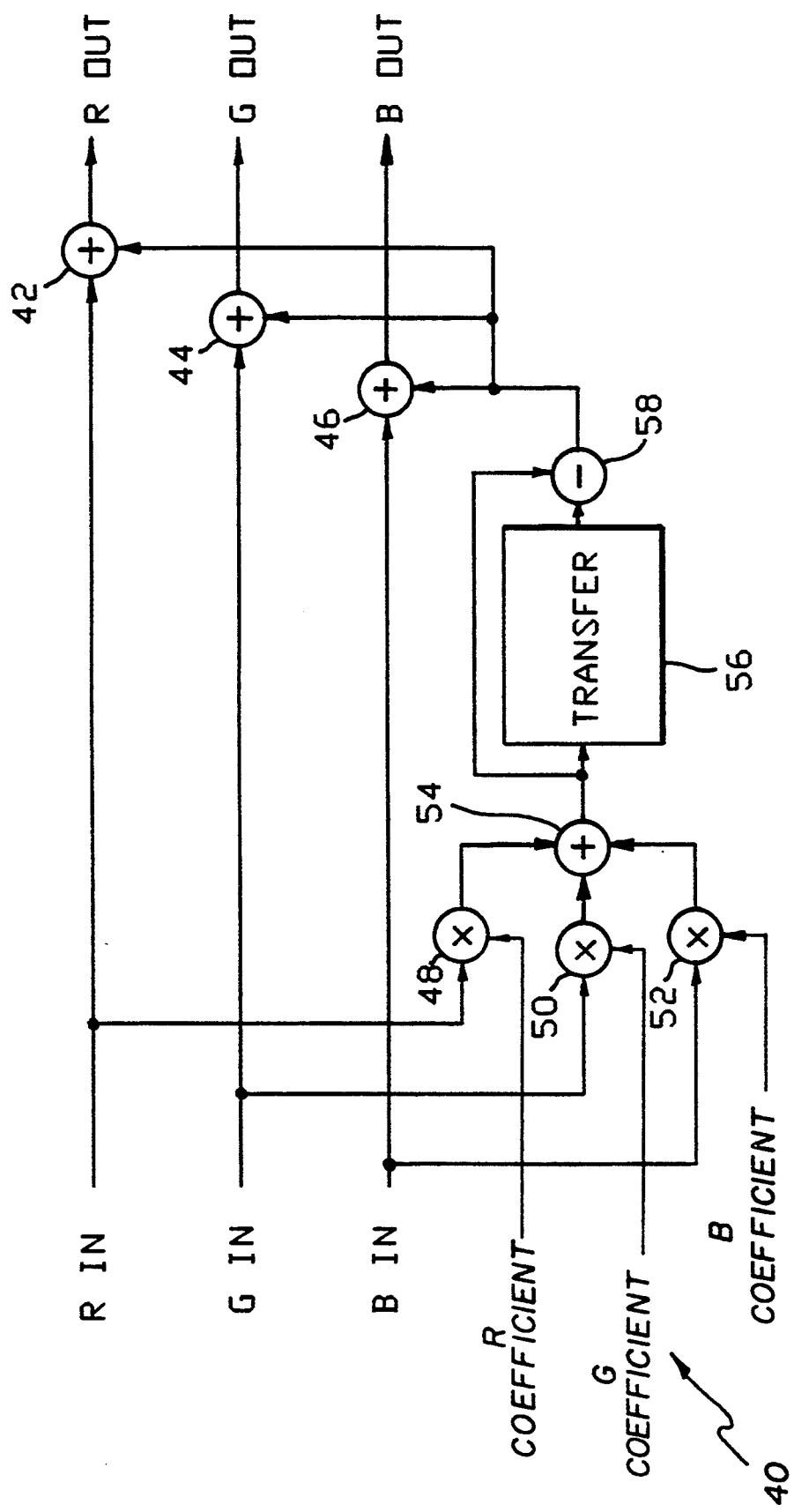
FIG. 4 illustrates, in block diagram form, an analog implementation of the method of the invention.

The analog implementation of this method is illustrated in FIG. 4. Three input signals Rin, Gin, and Bin are directed to inputs of three summing nodes 42, 44, and 46, respectively and to a set of three constant multipliers 48, 50, and 52, respectively. The output signals from the three multipliers are summed together in a summing node 54. The other inputs to the multipliers 48, 50 and 52 are the coefficients which form the luminance signal from the R, G, B signal. The summed signal is then directed to the input of a transfer function 56, which may be the transfer function of FIG. 3, with a feed-forward to a subtracter 58. The subtracter also receives the output from the transfer function 56 which is the new luminance signal. The output from the subtractor 58 is the difference between the new and the old luminance, which difference is directed as an input to each of the summing nodes 42, 44, and 46. The outputs from the summing nodes are the Rout, Gout and Bout signals.

The method previously described, in which the luminance difference is added to the original color signals, is appropriate when the input signals are proportional to the logarithm of the physical intensity of the light making up the color represented by three signals. If the representation of physical intensity by the electrical or digital signals is something other than a logarithm function, the circuits will need to be modified accordingly. For example, if the signal value is proportional to the intensity itself, then the ratio of the new luminance to the old luminance must be formed and this ratio used as a multiplier on the three original color signals.

In summary, the principal point of this invention is the formation of a luminance signal from the original color signal, using this to determine a new luminance, and then adjusting the original color to have this new luminance in a way which does not change the hue or saturation of the original color. This method can be embodied in a fairly simply analogue or digital circuit, or computed efficiently in a general-purpose computing device emulating the digital circuit. The method allows changes to color signals which affect the overall brightness only and in a non-linear way, while adding only a small amount of additional hardware or computation to implement the method.

While there has been shown what is considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

We claim:
1. A method of adjusting the luminance components of a set of three color signals without modifying the color components of said set comprising the steps of:
   (a) generating a first signal corresponding to a weighted average of the respective luminance components of said set of three color signals;
   (b) applying said first signal to a non-linear transform operator which produces a luminance difference signal corresponding to the difference between said weighted average of the respective luminance components of said set of three color signals and a non-linear transformation of said weighted average of the respective luminance components of said set of three color signals;
   (c) modifying each of the three color signals of said set in accordance with said luminance difference signal produced in step (b).

2. A method according to claim 1, wherein step (b) comprises applying said first signal to a look-up table in which said non-linear transform operator is stored and deriving from said look-up table said luminance difference signal corresponding to said difference between said weighted average of the respective luminance components of said set of three color signals and said non-linear transformation of said weighted average of the respective luminance components of said set of three color signals.

3. A method according to claim 1, wherein step (b) comprises applying said first signal to said non-linear transformation and deriving therefrom a second signal corresponding to said non-linear transformation of said weighted average of the respective luminance components of said set of three color signals, and producing said luminance difference signal as the difference between said first signal and said second signal.

4. A method according to claim 3, wherein step (a) comprises multiplying each respective luminance component of said set of three color signals by a respective coefficient, so as to obtain three product signals, and summing said three product signals to obtain said first signal corresponding to said weighted average.

5. An apparatus for adjusting the luminance components of a set of three color signals without modifying the color components of said set comprising:
   a weighted average signal processing operator to which said set of three color signals is applied and which is operative to generate a first signal corresponding to a weighted average of the respective luminance components of said set of three color signals;
   a non-linear transform operator to which said first signal is applied and which is operative to derive a second signal corresponding to the difference between said first signal and a non-linear transformation of said weighted average of the respective luminance components of said set of three color signals; and
   a set of signal modifiers to which said three color signals and said second signal are applied and which is operative to adjust each of said three color signals in accordance with said second signal.

6. An apparatus according to claim 5, wherein said nonlinear transform operator comprises a prescribed non-linear transformation which is operative to derive a third signal corresponding to said prescribed non-linear transformation of said weighted average of the respective luminance components of said set of three color signals, and a subtractor which is coupled to receive said first and third signals and is operative to take the difference between said first and third signals and thereby derive said second signal.

7. An apparatus according to claim 6, wherein said weighted average signal processing operator comprises a set of multipliers each of which is operative to multiply a respective luminance component of said set of three color signals by a respective coefficient, so as to obtain three product signals, and a summing device which is operative to sum said three product signals to obtain said first signal corresponding to said weighted average.

8. An apparatus according to claim 5, wherein said nonlinear transform operator comprises a look-up table in which said non-linear transformation is stored and which is operative to derive said second signal corresponding to said difference between said first signal and said non-linear transformation of said weighted average of the respective luminance components of said set of three color signals.

* * * * *